United States Patent Office 3,040,797
Patented June 26, 1962

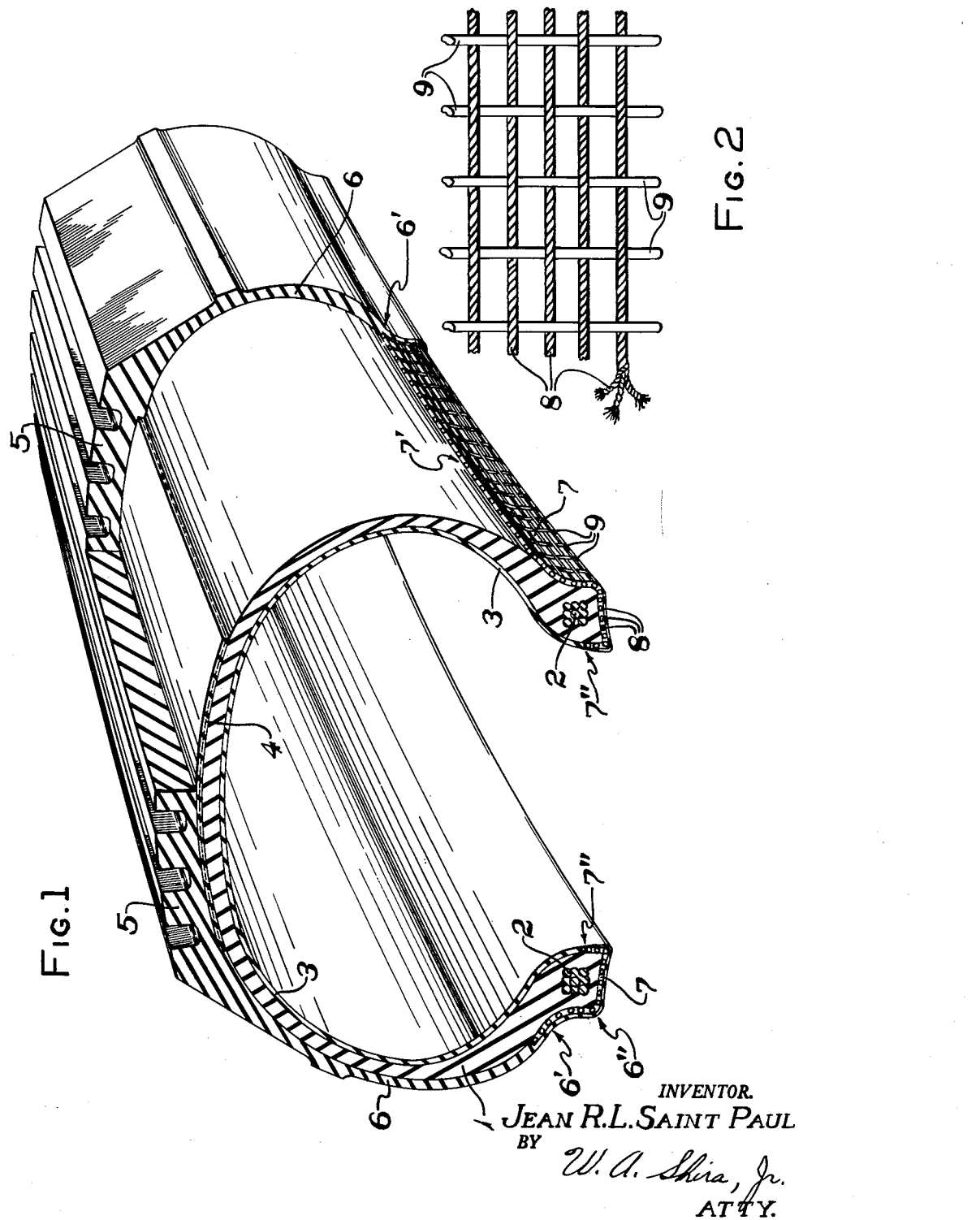

3,040,797
TUBELESS TIRE
Jean Robert Louis Saint Paul, Paris, France, assignor to Pneumatiques et Caoutchouc Manufacture Kleber-Colombes, Paris, France, a corporation of France
Filed July 15, 1957, Ser. No. 671,831
Claims priority, application France July 24, 1956
4 Claims. (Cl. 152—362)

This invention relates to tires used upon passenger cars, trucks, farm vehicles, airplanes and other vehicles. More particularly, the invention relates to tires of the tubeless type in which the heels of the beads are pressed against the sides of the rim flanges to form an air-tight seal under the pressure of the inflation fluid contained in the compartment formed by the tire and rim.

The conventional construction for vehicle tires comprises a plurality of plies or layers of rubberized fabric with portions thereof folded or turned around metallic bead cores to form spaced circumferentially extending beads. This carcass is covered on the exterior by tread and sidewall rubber and during the final steps of the assembly of the tire one or more bands or strips of fabric are placed upon the bead regions of the tire. These bands or strips of fabric extend along all or part of the entire area of contact between the tire beads and the rim on which the tire is mounted. One purpose of these bands or strips, which are known as chafer or finishing strips, is to aid in the proper retention of the ends of the carcass plies and the rubber covering thereover during the molding of the tire so that these portions of the tire are suitably formed and covered by the rubber. In addition, the bands or strips placed on the beads of the tire also protect the heels thereof against abrasion to which this region of the tire is subjected during mounting and operation. The finishing or chafer strips are generally made of square-woven fabric; that is to say, the fabric has essentially the same construction in both its warp and weft. This fabric is normally placed in the tire in a manner such that the warp and weft elements extend diagonally relative to the bead cores at angles in the order of 45°.

The construction of tubeless tires, employing procedures and materials conventionally used in making tires for use with tubes, has resulted in a number of serious difficulties because the beads of tubeless tires must be so constructed as to insure an air-tight seal of the beads with the wheel rims, which seal must be permanent during the entire life of the tire. This is not possible with constructions employing the usual fabric chafer or finishing strips because the cords comprising the warp and weft of such strips are porous since they are formed of a large number of individual filaments twisted together and the interstices between the filaments provide many communication channels through which the inflation air contained in the tire can travel or wick from the interior to the regions of lower pressure between plies and sidewalls of the tire and externally to the atmosphere. This wicking or travel of the inflation air is undesirable not only because it results in deflation of the tire, but also because it may cause separation between the plies of reinforcing material or between these plies and the sidewalls.

Various attempts have heretofore been made to remedy this difficulty in the bead regions of tubeless tires. For example, an attempt has been made to replace the usual fabric chafer or finishing strip with a rubber compound to provide the air-tight seal between the bead heels and the rim. This expedient has not always been completely satisfactory because rubber compounds of the types normally employed became quite plastic during vulcanization and are easily displaced by the molding pressures so that the bead heels may be uncovered in one or more areas, or the final rubber covering is so slight that it is soon abraded from the underlying cords when the tire is in operation. Another expedient has been the use of a band or strip of textile material placed on the diagonal or bias, as above described, but with the cords of the strip treated so that the interstices between the filaments thereof are filled with some substance that will block the interstices to the passage of air lengthwise of the cords. However, complete blocking is frequently not effected because the cords comprising the strip each include several hundred individual filaments and it is very difficult to penetrate completely into every interstice between these many filaments. Failure to effect complete blocking of all interstices or passages throughout the entire length of each cord can result in serious loss of air because the diagonal or bias relationship of the cords in the strips positions each cord for potential transfer of air and the usual close relationship and crossings of the cords facilitates travel of the inflation air, partially in one cord and partially in another cord, until it finds a region of lower pressure.

An object of this invention is to provide an improved arrangement for the chafer or finishing strips in the beads of tubeless tires which results in a material reduction of air leakage even though the textile cords comprising the strips are normally capable of providing channels for air passage. This is achieved by disposing the finishing strips so that the warp and weft elements thereof extend longitudinally and radially, or conversely, with respect to the tire beads, instead of on the bias as is customary, thereby considerably reducing the number of cords capable of communicating the interior of the tire with the exterior and thus correspondingly reducing the possibility of air leakage.

Another object of the invention is to provide an improved fabric for finishing or chafer strips of tubeless tires such that the elements extending in one direction of the fabric, either warp or weft, are impermeable to passage of air therealong or therethrough.

A further object of the invention is to provide an improved tubeless tire wherein the beads are provided with finishing strips having interwoven warp and weft elements disposed longitudinally and radially of the tire beads with the weft elements impermeable to the passage of inflation air.

A more specific object of the invention is to provide an improved fabric for finishing or chafer strips of tubeless tires wherein the elements extending longitudinally of the strip are formed of multifilament cords while the elements extending transversely of the strip are monofilaments of nylon or other synthetic textile substance.

It is also an object of the invention to provide an improved tubeless tire formed of rubber and reinforcing elements terminating in axially spaced beads each of which is provided with a finishing strip at least in the heel portions of the bead, which strips comprise interwoven warp and weft elements with the warp elements extending circumferentially of the beads and formed of multifilament cords, while the weft elements extending radially of the beads are formed of monofilaments of nylon, rayon, or other synthetic textile material.

Further objects and advantages of this invention will be apparent to those skilled in the art to which it pertains from the following description of a presently preferred embodiment, and certain modifications, described with reference to the accompanying drawing, forming a part of this application, and in which:

FIG. 1 is a fragmentary perspective view of a tire embodying the invention with portions in section and other parts broken away to more clearly show the construction; and FIG. 2 is an enlarged plan view of the presently preferred finishing strip fabric incorporating the invention.

The tire shown in FIG. 1 comprises the usual carcass 1 formed of rubber and reinforcing elements assembled in the known manner by superimposing plies of rubber covered cords, or like reinforcing elements, with the ends of the plies turned around bead cores 2, 2. The interior of the tire, which is intended to be mounted upon a rim without an inner tube, has a layer or lining 3 which is impervious to air and is, therefore, made of a compound having a suitable base of natural or synthetic rubber. The carcass may be reinforced in the crown or top area by means of the usual breaker strip or strips 4 and the tire is provided with the usual tread 5 and sidewalls 6 formed of natural or synthetic rubber compounds.

In accordance with this invention, the tire is provided with improved chafing or finishing strips 7, 7 which are placed in the bead portions of the tire externally of the carcass plies. As shown in FIG. 1, these strips are so placed that they cover the entire area in which the tire may contact the rim including both the base of the beads and the outer sides thereof. The strips 7, 7 comprise interwoven reinforcing elements with certain of the elements extending longitudinally of the strips and the other elements extending transversely of the strips, the strips being placed in the tire beads so that the longitudinal elements extend circumferentially of the tire beads and parallel to the bead cores, while the transverse reinforcing elements are disposed generally radial of the tire beads and hence substantially perpendicular to the bead cores.

The finishing strips 7, 7 may be placed so that they are united in abutting relationship with the edges of the inner lining 3, or the edges of the strips 7, 7 may be partially covered by the inner lining 3. In some cases, the inner lining 3 may entirely cover the strips 7, 7 and continue to the outsides of the bead heels.

The sidewall rubber 6 preferably covers the outer edges of the finishing strips 7, 7 and may terminate in the location indicated at 6' in FIG. 1 of the drawing, or go further down the sides of the beads to the location indicated as 6".

The finishing strips 7, 7 may be of width such that the outer edges terminate above the location where the tire rim engages the tire, as indicated at 7', and the other edges of the strips may be on the inside of the tire as indicated at 7" in FIG. 1. Alternatively, the strips may be of lesser width with the outer edges terminating at locations other than 7' and the inner edges of the strips terminating under the bead seat or even in the region indicated at 6" adjacent the heel of the bead.

The fabric comprising the improved finishing strips of this invention, which are incorporated in the tubeless tires as just described, is illustrated on an enlarged scale in FIG. 2. As shown therein, the fabric comprises interwoven warp and weft elements 8 and 9 which are disposed in what may be called a plain or cross weave. The elements 8 may be cords of known construction employed for tire reinforcement and each comprise a plurality of filaments of natural or synthetic textile substances such as cotton, rayon, nylon, or the like with the filaments twisted together to form cords as is well-known in the art. These cords provide a plurality of interstices or passageways between the filaments but, since they extend longitudinally of the fabric and the latter is placed in the tire so that these cords extend circumferentially of the tire beads, there is no passageway provided between the cords extending from the interior of the tire to locations between the carcass and the sidewall or externally of the tire, as is the case with conventional finishing strips employing multifilament cords disposed on the bias with respect to the tire beads. It it, however, preferable that the warp cords 8 be spaced from each other sufficiently to insure that the rubber calendered on the fabric will fill between the individual cords and provide an isolation or insulation therebetween. In place of the simple cross weave indicated in FIG. 2, the fabric can be so woven that the warp cords are grouped in bundles of two or more as in the case of a leno weave or other types of known fabrics, but with each group of threads or cords separated from the next group by a sufficient space to permit filling with rubber by a calendering operation.

The weft elements 9 must, in accordance with this invention, be substantially impermeable to the passage of air. Consequently, in the preferred embodiment, the weft elements 9 are single or monofilaments such as are produced by extrusion of rayon, nylon or similar synthetic textile materials. Filaments of this nature are such that they are not porous and hence do not permit the passage of air lengthwise thereof. These monofilaments may be of any suitable cross-section and, without limitation, may take forms which are round, flat, rectangular, or other shape in cross-section.

In place of employing singe or monofilaments as the weft elements 9, it is possible to utilize cords formed from a plurality of natural or synthetic fibers or filaments treated before weaving so that all interstices or spaces between the individual fibers or filaments are filled. This treatment may, for example, comprise dipping the cords while under a very low tension in a solution of resorcinol formaldehyde or other cord-to-rubber adhesion promoting substance which may be or may not be mixed with a natural or synthetic rubber latex, the dipping being followed by a drying step to set the liquid materials in solid form. This treatment can be followed by or replaced by impregnation to the very center of the cords by a natural or synthetic rubber compound in solution.

The weft elements or cords may also comprise a relatively small number of individual filaments or fibers of synthetic material each of large diameter so that there are many less passages or channels than are present in the usual multifilament cords. These open spaces may be more readily blocked to the passage of air longitudinally therethrough by the process mentioned above or even by passage of the cord through a tuber which fills the spaces with rubber or thermoplastic material. The individual fibers of filaments of such cords may have a round, flat, rectangular or other desired shape in cross-section.

It has been mentioned that when the weft elements 9 each comprise more than a single filament, they can be impregnated before weaving to prevent passage of air longitudinally therethrough. It is also possible to render the weft elements non-wicking by subjecting the entire fabric, subsequent to weaving, to one of the processes mentioned above.

The fabric employed in the finishing strips made in accordance with this invention preferably receives an additional treatment before being placed in the tire, which treatment is well-known in the industry for providing good adhesion with rubber and may include, without limitation thereto, a dip in a cord-to-rubber adhesion promoting substance. After the adhesion increasing treatment, the fabric is preferably calendered on both sides with natural or synthetic rubber compounds which may be the same on both sides of the fabric, or the rubber calendered on one side may differ from that calendered on the other. Preferably, rubber compounds having the best air-impermeable characteristics will be applied to the side of the fabric which is to be placed in contact with the carcass of the tire and the layer of rubber which is outermost should be such as to have good resistance to abrasion and wear. The layer of rubber on the outer side of the fabric may be of sufficient thickness to provide, during vulcanization of the tire, the formation of sealing ribs and grooves which improve the air-tight seal of the bead with the rim.

The fabric of the finishing strips is preferably an open weave; that is to say, the number of warp and weft threads per unit area is such that there are free spaces between the elements, or between the groups of elements when the elements are grouped together as in the leno or similar weaves. This not only provides for a good union between the layers of rubber covering the fabric, but also provides isolation or insulation between the individual elements so that the possibility of leakage is still further reduced. It is possible to employ the same number of reinforcing elements per unit area in the warp and weft, but since the elements of the weft are the only ones which are positioned such that it is potentially possible for them to communicate air from the inside of the tire to the outer parts of the carcass and/or the atmosphere, it is advantageous to employ as few weft elements as possible. Consequently, the preferred fabric, as shown in FIG. 2, is of the type wherein the number of warp elements per unit area of fabric is greater than the number of weft elements in that unit area.

A specific but non-limiting example of a fabric construction which embodies the principles of this invention is one having 10 to 20 warp elements per centimeter of the fabric, the elements being nylon cords of 200 to 300 denier and composed of 30 to 40 individual filaments twisted together with a twist of 100 to 200 twists per meter. This fabric has 2 to 12 weft elements per centimeter with each element being a single monofilament of nylon having a diameter of 0.1 to 0.8 millimeter. The elements are interwoven in a manner known as a leno weave.

Another specific example of fabric embodying this invention has 8 to 25 warp elements per centimeter with each element being a cord of rayon of 400 to 1700 denier made of 200 to 1000 filaments twisted together with a twist of 100 to 300 turns per meter. There are 2 to 10 weft elements per centimeter each comprising a single monofilament of nylon having a diameter of 0.1 to 0.8 millimeter. This fabric is woven in the usual manner known as a plain or cross weave.

Other suitable fabrics can be prepared, in accordance with the principles of this invention, employing warp and weft members of different number and size since the invention is not limited to the specific examples just given. Moreover, while the tire illustrated in the drawing and herein described has but one finishing or chafing strip in each bead, the invention is not limited to this construction, but also applies to tires having several finishing strips in each bead. In such a case, all of the strips may be made in accordance with the invention or only the outermost of the finishing strips may have the special characteristics of non-wicking achieved by this invention. It is also to be understood that the invention can be applied to tires having more than one bead core in each bead. Furthermore, it is within the scope of the invention to use as a finishing strip a cross-woven fabric in which the warp makes an angle other than 90° with the weft. Such a fabric can be made, for example, from a cross-woven fabric of loose weave prepared in the usual manner with the fabric subsequently pulled out of shape, before or after calendering, by exerting tension in opposite directions on the two hems or selvage edges. Finishing strips made with the fabric prepared in this manner should be placed in the beads of the tire so that the cords, the directions of which remain unchanged, extend generally circumferentially while the transverse elements, which are rendered impermeable to air, are placed to extend transversely of the beads in a diagonal or bias direction. These and other modifications and adaptations of the invention, which will readily occur to one skilled in the art, are all deemed to be within the ambit of the invention, the scope of which is defined in the appended claims.

Having thus described the invention, I claim:

1. A tubeless inflatable tire comprising a carcass adapted to be mounted on a flanged wheel rim and cooperate therewith to form an inflation chamber, the said carcass being formed of rubber and reinforcing elements terminating in axially spaced rim engageable beads each provided with a non-wicking fabric finishing strip, the said finishing strips each including cross woven warp and weft elements with the warp elements extending circumferentially of the beads in laterally spaced relationship and each formed of a plurality of filaments twisted together, the said weft elements extending transversely of the beads with one end of each weft element disposed at a location within said inflation chamber in the region of a bead and the other end in a region radially outwardly of the said rim flanges, the said weft elements each being a single filament, and rubber covering the elements of said strips and filling the spaces between said elements.

2. A tubeless tire as defined in claim 1 wherein the number of warp elements per unit area of the strips exceeds the number of weft elements.

3. A tubeless inflatable tire comprising a carcass adapted to be mounted on a flanged wheel rim and cooperate therewith to form an inflation chamber, the said carcass being formed of rubber and reinforcing elements terminating in axially spaced rim engageable beads each provided with a rubber covered non-wicking fabric finishing strip, the said finishing strips each including cross woven warp and weft elements with the warp elements extending circumferentially of the beads in laterally spaced relationship and each formed of a plurality of filaments twisted together, and the weft elements extending transversely of the beads with one end of each weft element disposed at a location within said inflation chamber in the region of a bead and the other end in a region radially outwardly of said rim flanges, the said weft elements being formed of spaced monofilaments of a synthetic textile substance, whereby inflation air cannot travel from the interior of the tire lengthwise of said weft elements.

4. A tubeless inflatable tire comprising a carcass adapted to be mounted on a flanged wheel rim and cooperate therewith to form an inflation chamber, the said carcass being formed of rubber and reinforcing elements terminating in axially spaced rim engageable beads each provided with a rubber covered non-wicking finishing strip, the said strips each including interwoven warp and weft elements with the warp elements extending circumferentially of the beads in laterally spaced relationship and each formed of textile cords comprising a plurality of filaments twisted together, the said weft elements extending transversely of the beads with one end of each weft element disposed at a location within said inflation chamber in the region of a bead and the other end in a region radially outwardly of said rim flanges, the said weft elements being formed of a lesser number of filaments than the warp elements with the passages between the filaments of the weft elements blocked to the passage of air longitudinally thereof.

References Cited in the file of this patent

UNITED STATES PATENTS

| 2,514,429 | Waugh | July 11, 1950 |
|---|---|---|
| 2,592,844 | Antonson | Apr. 15, 1952 |
| 2,601,394 | Hansen | June 24, 1952 |
| 2,822,018 | Perdriau | Feb. 4, 1958 |
| 2,934,126 | Wilson | Apr. 26, 1960 |

FOREIGN PATENTS

| 1,084,382 | France | July 7, 1954 |